United States Patent [19]

Schulte et al.

[11] 4,257,992
[45] Mar. 24, 1981

[54] METHOD AND AN APPARATUS FOR THE PRODUCTION OF ARTICLES WHICH CONSIST OF FILLER-CONTAINING SYNTHETIC MATERIAL, IN PARTICULAR OF FOAM

[75] Inventors: Klaus Schulte; Heinrich Ersfeld; Hans Wirtz, all of Leverkusen, Fed. Rep. of Germany

[73] Assignee: Bayer Aktiengesellschaft, Leverkusen, Fed. Rep. of Germany

[21] Appl. No.: 66,747

[22] Filed: Aug. 15, 1979

[30] Foreign Application Priority Data

Aug. 28, 1978 [DE] Fed. Rep. of Germany ....... 2837425

[51] Int. Cl.$^3$ ............................................. B29D 27/00
[52] U.S. Cl. ................................ 264/45.3; 264/328.2; 264/328.18; 264/DIG. 83; 425/155; 425/166; 425/543; 425/817 R
[58] Field of Search ........... 264/DIG. 83, 45.3, 328.2, 264/328.18; 425/155, 166, 543, 817 R

[56] References Cited

U.S. PATENT DOCUMENTS

| | | | |
|---|---|---|---|
| 3,706,515 | 12/1972 | Keuerleber et al. | 264/45.3 X |
| 3,843,100 | 10/1974 | Haas et al. | 264/45.3 X |
| 3,908,862 | 9/1975 | Chandra et al. | 264/DIG. 83 |
| 4,013,391 | 3/1977 | Boden et al. | 264/DIG. 83 |
| 4,073,840 | 2/1978 | Saidla | 264/45.3 |

FOREIGN PATENT DOCUMENTS 2737616  3/1979  Fed. Rep. of Germany ... 264/DIG. 83

Primary Examiner—Philip Anderson
Attorney, Agent, or Firm—Gene Harsh; Joseph C. Gil; R. Brent Olson

[57] ABSTRACT

The invention relates to a method, and an apparatus, for the production of articles which consist of filler-containing synthetic material, in particular a foam, wherein flowable reactants, at least one of which has previously been charged with filler, are injected into a mixing zone under predetermined injection pressures, wherein the reaction mixture is subsequently introduced into a mold.

Cellular materials such as flexible, semi-rigid, rigid or structured foam based, for example, on polyurethane or isocyanurate, and also non-cellular materials such as elastomers, may be produced by methods of this type.

7 Claims, 2 Drawing Figures

METHOD AND AN APPARATUS FOR THE PRODUCTION OF ARTICLES WHICH CONSIST OF FILLER-CONTAINING SYNTHETIC MATERIAL, IN PARTICULAR OF FOAM

BACKGROUND OF THE INVENTION

The incorporation of fillers, for example, during the production of articles made from foams, particularly those made from polyurethane foams, allows specific qualities to be imparted to the finished product, and/or allows waste materials to be utilized and/or allows the material costs to be reduced. Examples of conventional fillers include, cement, lime or chalk, barium sulfate, organic fibers, inorganic fibers, and particularly short glass fibers and ground glass fibers, as well as powdered foam which has been produced from crushed foam scraps.

Piston cylinder units utilizing the positive displacement principle, wherein reactants are metered into the mixing chamber, or circulated, are already known. These apparatus operate in high pressure ranges, i.e. at injection pressures above about 20 bars. These high pressure ranges are eminently suitable and even essential when introducing large quantities of reactants, to be mixed, into the cavity of a mold within a short period. It must be applied, when fast reacting components are being used. The processing of filler-containing reactants with these previously known piston cylinder units gives rise to difficulties because the entire circulatory system has to be produced from wear-resistant material. It is doubtful whether the sometimes quite complicated control elements used in the mixer heads, for example, control pistons with return grooves, can be produced economically, from such materials, to conform to the tolerances necessary.

Methods are also known which operate in the so-called low pressure range, wherein the filler is introduced in the dry state, together with the reaction mixture, into a stirrer chamber where they are mixed together. However, it is only possible to apply this method with component systems that react slowly.

DESCRIPTION OF THE INVENTION

Figure 1:
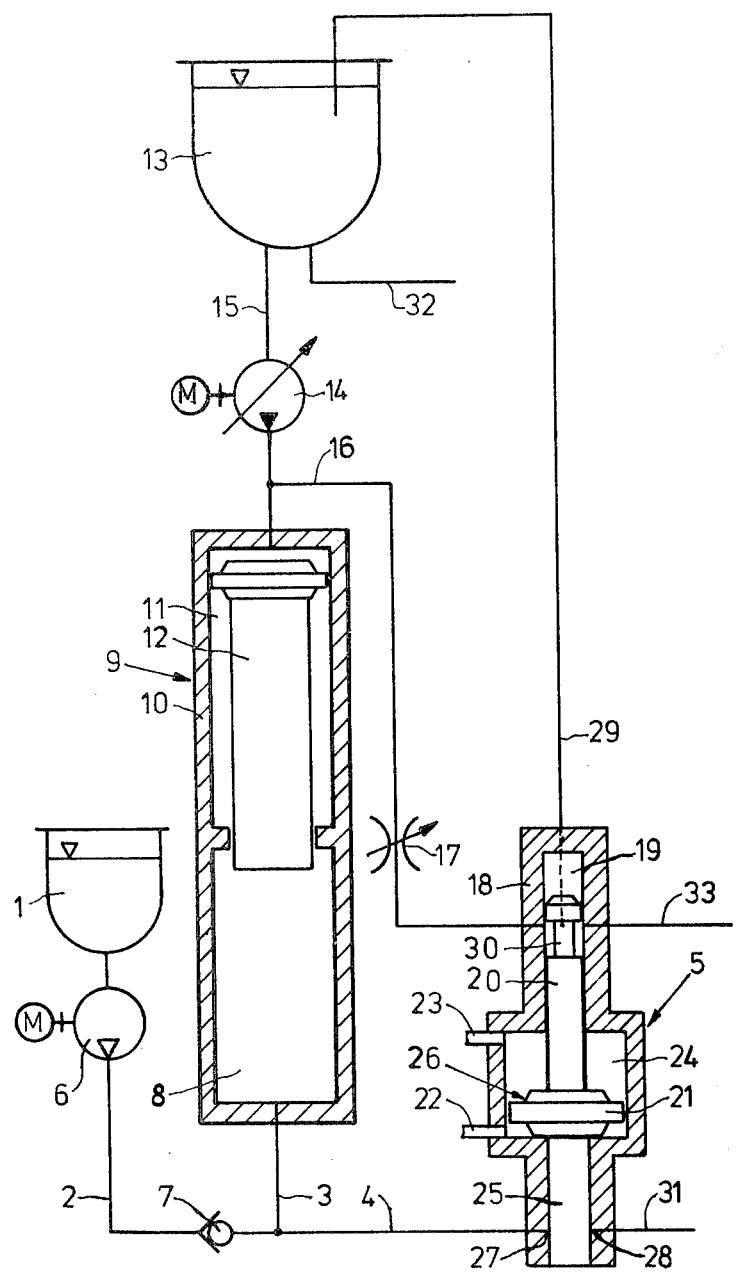
FIG. 1 shows the first embodiment, in which the control element for the reactant simultaneously represents the blocking element for the hydraulic fluid return pipe.

The object of this invention is to provide a method, and an apparatus, with which flowable, filler-containing, fast-reacting components can be mixed with small mechanical outlay and wear, for the production of filler-containing articles made of synthetic materials, particularly articles made of a foam.

The method, according to the invention, for achieving this objective involves the exertion of a pressure corresponding to the injection pressure on at least the filler-containing component, even during pauses when mixing is not taking place.

This means that the filler-containing reactant need not be conveyed in a harmful cycle causing both wear and disassociation. Because the filler-containing reactant remains subjected to the injection pressure at all times, it is possible to meter the reactants at speeds high enough to keep wear to a minimum over paths kept as short as possible.

In one embodiment of the method, the pressure corresponding to the injection pressure is applied by means of a hydraulic fluid whose flow is controlled synchronously with the times at which the reactants enter the mixing zone and are blocked from the mixing zone. This objective is met by providing a continuous flow of, and pressure on, the hydraulic fluid system wherein a recirculation system is also provided to allow flow and prohibit pressure build-up during the time periods in which the reactants are not themselves flowing.

Obviously the pressure of the hydraulic fluid can be identical to the injection pressure or can be higher or lower corresponding to a predetermined ratio. The special method of monitoring the flow of hydraulic fluid in the instant invention has the particular advantage that the recirculation of hydraulic fluid can be interrupted synchronously with the opening of the inlets, in cooperation with the injection pressure, so as to allow the hydraulic fluid to convey the filler-containing reactant into the mixing zone. The metering process is thus begun and ended precisely at the moments when the inlet openings are opened and closed respectively.

The apparatus for carrying out the method is based on storage containers for reactants from which feed pipes containing metering means open, via inlet openings, monitored by a control element, into the mixing chamber of a mixer head, wherein a mold may be attached to its outlet opening, wherein at least said metering means for the filler-containing reactant is designed as a hydraulic piston cylinder unit, wherein the positive displacement chamber has merging into it the section of said feed pipe from said storage container and from which a second section of said feed pipe leads to the inlet openings of said mixing chamber, and wherein the piston of said piston cylinder unit is driven in a hydraulic chamber, the hydraulic pipe leading from said storage container and having a metering pump arranged in it, merges into said hydraulic chamber.

The novelty lies in the fact that a return pipe containing a throttle valve is provided branching from the hydraulic feed pipe between the metering pump and the hydraulic chamber leading back to the storage container. Said return pipe has a blocking element which is connected to the control element via a forced control means.

This enables the throttle valve in the return pipe to ensure that a pressure corresponding to the injection pressure or in a suitable step-up or step-down ratio to it, is maintained. This pressure is produced by continuous operation of the metering pump. The monitoring of said flow of hydraulic fluid by switching to forward flow or to return flow in direct dependence upon the control element of the injection openings bringing about exact metering without any transitional disturbances between these two steps of the method.

The other component containing no filler can be metered in the conventional manner using gear pumps, series piston pumps, radial piston pumps or axial piston pumps. It is also, however, possible to meter it with a piston cylinder unit.

In a preferred embodiment of the apparatus according to the invention, the blocking element is formed, by the control element, as a forced control means, said control element consisting of a housing with a piston movable therein, the piston serving to control the injection opening while its rod has a bridging duct, wherein the return hydraulic route passing through the housing, can be opened or closed.

The advantage of this embodiment lies in the unit comprising a blocking element and control element, wherein the control means for the filler-containing component is inevitably coupled to the control means for the hydraulic fluid.

In a preferred, alternative embodiment, a special blocking element is arranged in the return pipe and the control element is provided with an electronic proximity switch as the forced control means, which is connected to a pulse converter communicating with the control element of the blocking element.

This embodiment allows the spatial separation of mixer head and blocking element which is accompanied by advantages with regard to construction and maintenance.

Proximity switches, of this type, switch without contact. Their switching attack can be used for controlling the mechanical/electronic devices of a relay etc. They are described, for example, in the K 78 brochure issued by Selectron Lyss A.G., Industrielle Elektronik, CH-3250-Lyss, entitled "SELEPROX® Proximity Switch".

Pulse converters are marketed in many designs and electrically activatable, directional, control valves such as, for example, the WG S 2-3 type illustrated in document 5000 (March 1971) published by HAWE, Heilmeier und Weinlein, Neumarkter Str. 26, D-8 Munich 80, and are suitable as the blocking element. Preferably, an adjustable time delay member is located between said pulse converter and said control member of said blocking element.

This is particularly advantageous if the other components are also controllable in a like manner as said filler-containing component. Indeed, if one of the reactants is more viscous than the others, for example, then the effect of the hydraulic metering system can be delayed for the less viscous component by suitable adjustment of said time delay member consisting, for example, of a time relay, in such a way that both components enter the mixing chamber at exactly the same time.

The apparatus according to the invention is illustrated schematically in two embodiments in the drawings, and described in more detail below.

In FIG. 1, a supply container 1 for a filler containing reactant is indirectly connected to a mixer head 5 via a pipe consisting of three sections 2, 3, 4. The first section 2 contains a thickener pump 6 and a back flow stop 7. The second section 3 branches off downstream of said thickener pump and said backflow stop and merges into the positive displacement chamber 8 of a piston cylinder unit 9. The third section 4 extends between the branching off position and the mixer head 5. The housing 10 of this unit 9 having a second hydraulic chamber 11 wherein a piston 12 is guided. A hydraulic pipe 15 coming from a hydraulic fluid supply container 13 and containing a high pressure metering pump 14 merges into this chamber 11. A return pipe 16 branches from this hydraulic pipe 15 between said high pressure metering pump 14 and said hydraulic chamber 11 containing a throttle valve 17, leading into the housing 18 of the mixer head 5 and ending at housing passage 19. The rod 20 of said control element 26 consisting of a hydraulic piston 21 driven in a hydraulic chamber 24 having feed pipes and delivery pipes 22, 23 and a control piston 25 movable within it. The control piston 25 movable in the mixing chamber bore, filling said bore in the position illustrated and thereby sealing the injection openings 27, 28.

A second section 29 of said return pipe leads from the housing 18 (from the rear of the housing 18, in the drawing) back into the supply container 13. The control element 26, in the position illustrated, has a bridging duct 30 provided in control element rod 20 designed as an annular groove, connecting the two sections 16 and 29.

The metering system for the second reactant is constructed in a similar manner, but only indicated in the illustration as the pipe 31 for the component, the hydraulic fluid pipe 32 and the first section 33 of the hydraulic return pipe. Its second section is identical to said return pipe section 29.

The metering system for the second or any subsequent component can, however, also be designed in the conventional manner, with or without circulation of components, via metering piston pumps, metering gear pumps or the like.

The mode of operation of this apparatus according to FIG. 1 with identical metering systems for both reactants is illustrated in the following embodiment.

The supply container 1 is filled with a polyol which contains 20% powdered glass fiber. An isocyanate is stored in a second supply container (not shown). The isocyanate component is conveyed to the mixer head in the same manner as the polyol component, therefore its path of travel is not described in more detail.

The thickener conveying pump 6 operates in such a way that when the high pressure metering pump 14 is turned off the piston 12 is pushed back in the piston cylinder unit 9 and the positive displacement chamber 8 fills with the filler-containing polyol component. During this step, the control piston 25 seals the inlet openings 27, 28 of the mixing chamber. When the positive displacement chamber 8 is full, the thickener conveying pump 6 switches off, and the high pressure metering pump 14 begins to operate, pumping hydraulic fluid from the supply container 13 via the pipe 15 and charging the piston 12 in the hydraulic chamber 11. However, since the inlet opening 27 is still sealed and a check valve 7 prevents a backflow in pipe 2, an injection pressure of 100 bars builds up in the polyol component. It is adjusted by means of the throttle valve 17 arranged in the return pipe 16. Since the hydraulically chargeable face of the piston 12 and its face which is charged by the component are in a ratio of 2 : 1, the pressure of the hydraulic fluid adjusted at the throttle valve amounts to 50 bars at the desired injection pressure of 100 bars. Once the injection pressure has built up, the apparatus is ready for operation, and the control element 26 is brought into the "mix" position. That is to say, the piston 25 travels back so that the mixing chamber is formed and the two components can enter the mixing chamber through the inlet openings 27, 28. Since the rod 20, having the bridging duct 30 via which the excess hydraulic fluid used to flow from sections 16 and 33 to section 29, is rigidly joined to the piston 25, the bridging duct 30 passes out of the region where the return pipe sections 16, 29, 33 merge. The back flow of the hydraulic fluid is thus interrupted by the rod 20 and the components are conveyed into the mixing chamber while the hydraulic fluid pushes, for example, the piston 12 forwards, in so doing, pushing the polyol component out of the positive displacement chamber 8 into the mixing chamber via the pipe sections 3, 4 and the inlet openings 27, owing to the backflow check valve 7. There, the components are mixed with the isocyanate component entering through the inlet opening 28 and the reaction mixture is discharged into a mold. Once the necessary amount of mixture has been produced, the control element 26 is brought into the "pause" position. That is to say, said piston 25 displaces the cavity of the mixing chamber and in so doing seals the inlet openings 27, 28. As the distance between the bridging duct 30 and the edge of the piston 25 as well as the distances between the inlet openings 27, 28 and the openings in the return pipe sections 16, 29, 33 are precisely adapted to each other, the return of the hydraulic fluid is released precisely with the sealing of the inlet openings 27, 28. If there is still a sufficient amount of reactants in the positive displacement chambers, the next operating procedure begins with readjustment of the control element 25 to the "mix" position. If the positive displacement chamber is no longer sufficiently full, the filling procedure described at the outset must be initiated first.

Figure 2:
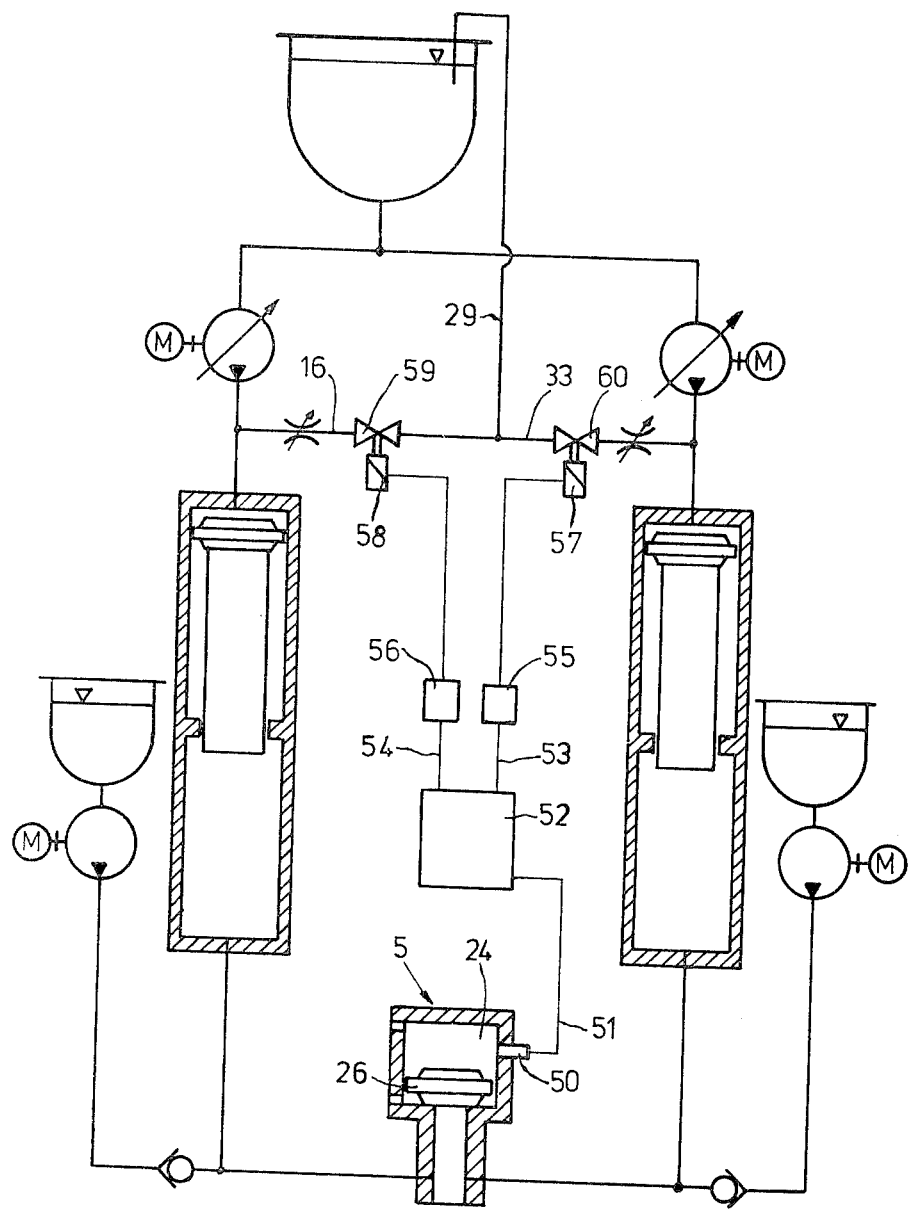
FIG. 2 shows the second embodiment, in which blocking elements for the hydraulic fluid return pipes are activated electronically, in dependence on the control element for both components.

The apparatus according to FIG. 2 substantially corresponds in structure and mode of operation to that in FIG. 1, so that the discussion about the different parts can be limited. Therefore, the reference numerals from FIG. 1 are adopted for identical parts as far as possible.

The control element 26 of the mixer head 5 does not have a backward extension but instead a contact-free, switching, electronic proximity switch 50, pointing into the hydraulic chamber 24. A pulse line 51 connects it to a pulse converter 52. Pulse lines 53, 54 lead via time delay members 55, 56 to control members 57, 58 of the blocking elements 59, 60, which are arranged in the return pipes 16, 33.

Each of the pulse lines 53, 54 contains a time delay member 55, 56, and although not necessary gives the operators more opportunities for variation and correction of their reactants.

However, it is sufficient to arrange a single blocking element in the common section 29 of the return pipe whose control member is connected via a pulse line to the pulse converter 52, said time delay member.

The mode of operation of the apparatus according to FIG. 2 which differs from the apparatus according to FIG. 1 is as follows:

If the control element 26 is switched to "mix", the proximity switch 50 receives the signal and transmits the switching pulse via the pulse line 51 to the pulse converter 52. The pulse converter immediately transmits the pulse as a switching instruction via pulse lines 53, 54 to the time delay members 55, 56, by which the member 55 is allocated to the dosing system for the highly viscous filler-containing component. It is adjusted to the value "zero" and therefore allows the switching instruction through without delay to the control member 57 which suddenly closes the blocking element 60. The time delay member 56 for the metering system of the less viscous component delays the switching instructions by 0.05 seconds before it transmits it to the control member 58 of the blocking element 59 which closes after the said time interval in relation to the blocking element 60. This causes the more inert component of higher viscosity and the component of lower viscosity, which can be accelerated more rapidly, to be injected simultaneously into the mixing chamber.

If the control element 26 switches to the "pause position", the proximity switch 50 also receives this pulse and transmits it to the blocking elements 59, 60 thereby causing said blocking elements to open.

What is claimed is:

1. In a method of producing articles which consist of filler-containing synthetic material, in particular a foam, wherein flowable reactants, at least one of which has previously been charged with filler, are injected into a mixing zone under predetermined injection pressures, wherein the reaction mixture is subsequently introduced into a mold, the improvement comprising exerting a pressure corresponding to the injection pressure, at least, on the filler-containing reactant, even during pauses at which time mixing does not take place by applying a pressure corresponding to the injection pressure to the hydraulic fluid whose flow is produced continuously and whose pressure is allowed to act continuously on the filler-containing reactant and thereby conveys it into the mixing zone during the mixing period, and wherein the flow of hydraulic fluid is recirculated during pauses corresponding to the period during which there is no reactant flow until the time when the reactant enters the mixing zone.

2. Apparatus for the preparation of a reaction mixture, from fluid components, comprising supply containers for the reactants, from which feed pipes containing metering means merge via inlet openings, into the mixing chamber of a mixer head, said mixing chamber capable of being monitored by a control element, said control element having a control means and a blocking means, wherein the improvement comprises at least the metering means arranged in the filler-containing feed line being a positive displacement chamber in whose positive displacement side the feed pipe from the supply container merges and a second section of feed pipe leads off to said inlet opening of said mixing chamber, wherein the hydraulic side of said positive displacement chamber has merging into it a hydraulic feed line from a hydraulic supply container via a high pressure metering pump, characterized in that a return hydraulic line containing a throttle valve branches from said hydraulic feed line, between the said high pressure metering pump and said hydraulic side of said positive displacement chamber merging into the control element, wherein a second section of hydraulic return line merges into said hydraulic supply container from said control element.

3. The apparatus of claim 2 characterized in that backflow into the reactant storage tank is prevented by the insertion of backflow check valves in the feed lines between said storage tanks and said positive displacement chambers.

4. The apparatus of claim 2, characterized in that all the reactant fluid feed lines utilize a positive displacement chamber.

5. The apparatus of claim 2, characterized in that the blocking element is a control piston displaceable within the housing of said mixing chamber.

6. The apparatus of claim 2, wherein blocking means are arranged in the hydraulic return pipes and wherein said control element is provided with an electronic proximity switch as the hydraulic control means, which is connected to a pulse converter which communicates with a control member for the blocking means.

7. The apparatus of claim 4, characterized in that a time delay member is arranged between said pulse converter and said control member.

* * * * *